United States Patent [19]

Brumfield

[11] 4,312,757
[45] Jan. 26, 1982

[54] METHODS AND MEANS FOR CIRCULATING A DIALYSATE

[76] Inventor: Robert C. Brumfield, P.O. Dr. CC, 42 Lakeshore Ter., Incline Village, Nev. 89450

[21] Appl. No.: 204,152

[22] Filed: Nov. 5, 1980

Related U.S. Application Data

[63] Continuation-in-part of Ser. No. 28,239, Apr. 9, 1979, abandoned, which is a continuation-in-part of Ser. No. 935,928, Aug. 23, 1978, abandoned.

[51] Int. Cl.³ .......................... B01D 13/00; C02F 1/44
[52] U.S. Cl. .......... 210/646; 128/DIG. 3; 165/109 R; 210/321.3; 210/321.4; 210/644; 210/645; 422/48; 435/2
[58] Field of Search ............. 165/109 R; 422/48, 227, 422/230; 128/DIG. 3; 210/321 B, 416 M, 22 A, 497.1, 321 A, 456, 321.3, 321.4, 644, 645, 646; 435/5

[56] References Cited

U.S. PATENT DOCUMENTS

| 2,134,571 | 10/1938 | Morlock | 422/227 X |
|---|---|---|---|
| 2,536,603 | 1/1951 | Homboe | 422/227 X |
| 2,692,854 | 10/1954 | Henley | 210/644 X |
| 3,212,860 | 10/1965 | Vernon | 422/230 X |
| 3,280,899 | 10/1966 | Brasie | 165/109 |
| 3,373,802 | 3/1968 | Wiklynd et al. | 165/109 X |
| 3,380,513 | 4/1968 | Staats | 165/109 X |
| 3,422,008 | 1/1969 | McLain | 210/321.1 |
| 3,442,002 | 5/1969 | Gearly et al. | 210/321.1 |
| 3,557,962 | 1/1971 | Kohl | 210/321.1 |
| 3,583,907 | 6/1971 | Borsanyi | 210/321.2 X |
| 3,672,509 | 6/1972 | Birhmann et al. | 210/321.1 |
| 3,794,468 | 2/1974 | Leonard | 422/48 |
| 3,856,475 | 12/1974 | Marx | 422/48 X |
| 3,917,457 | 11/1975 | Bergstrom | 422/227 |
| 3,934,982 | 1/1976 | Arp | 422/48 |
| 3,963,622 | 6/1976 | Baudet et al. | 210/321.1 |
| 4,038,190 | 7/1977 | Baudet et al. | 210/321.1 |
| 4,075,100 | 2/1978 | Furuta et al. | 210/321.1 X |
| 4,140,637 | 2/1979 | Walter | 210/321.1 |

*Primary Examiner*—Barry Richman
*Attorney, Agent, or Firm*—Phillips, Moore, Weissenberger, Lempio & Majestic

[57] ABSTRACT

The operating efficiency of a mass transfer device such as a blood dialyzer is considerably enhanced by subjecting the blood-carrying semipermeable fibers of the dialyzer to a toroidal dialysate flow produced within the fiber cartridge by one or more impeller or pump elements. The impellers may be rotary for continuous flow, or pistons with or without internal check valves may be used for intermittent or reciprocating flow. Moving adjacent impellers in opposite directions creates homogeneous zones of different impurity concentration within the dialyzer.

11 Claims, 6 Drawing Figures

METHODS AND MEANS FOR CIRCULATING A DIALYSATE

This is a continuation-in-part of my copending application Ser. No. 28,239, filed Apr. 9, 1979, entitled "Toroidal Flow System for Mass Transfer Device", now abandoned, which is in turn a continuation-in-part of Ser. No. 935,928 filed Aug. 23, 1978 and entitled "Toroidal Flow System", now abandoned.

BACKGROUND OF THE INVENTION

Mass transfer devices such as blood dialyzers commonly consist of a cylindrical cartridge containing a large number of thin hollow semipermeable membrane fibers extending generally longitudinally of the cartridge. The fibers are immersed in a bath of dialysate which is introduced into the cartridge in such a manner as to flow across the fibers, dialysis takes place through the surface of the fibers.

Normally, the dialysate used in blood dialysis is a saline solution of low viscosity. In accordance with recent research, however, better results have been obtained by the use of slurries which exhibit a much greater viscosity. Although the handling of both types of dialysates is generally similar, the physical structures best adapted to each type of dialysate differ.

The efficiency of the dialysis process depends to a substantial degree on producing flow patterns of the dialysate with respect to the fibers which avoid chanelling of the dialysate. In a conventional dialyzer, in which dialysate is simply introduced radially at one end of the cartridge and withdrawn radially at the other, there are a number of dead spots and areas of uneven flow distribution. Furthermore, a single generally axial pass of the dialysate through the cartridge does not give the dialysate enough contact time with the fibers to utilize its dialyzing capabilities to the fullest extent.

SUMMARY OF THE INVENTION

In accordance with the invention, the dialysate is introduced into an axial core of the cartridge, in which one or more pumping elements such as rotary impellers or pistons are imposed. The pump elements move the dialysate in the core at a flow rate which is substantially greater than the supply rate at which dialysate is introduced into, and withdrawn from, the cartridge. As a result, each pumping element generates a rapid dialysate flow in a toroidal pattern through the capillary fiber bundle. By stacking a plurality of pumping elements along the axis of the cartridge and arranging them to generate adjacent toroidal flow patterns or fields of opposite directions of rotation, the flow directions along the planes of tangency of adjacent toroids are similar, and mixing between adjacent fields occurs essentially only at the supply rate. Consequently, each field forms a cell which acts essentially as if it were alone, and each such cell maintains its own characteristic homogeneous composition.

The high rate toroidal flow within the cells also prevents stagnant fluid accumulation at the fiber walls or membrane walls, thereby reducing the thickness of the contaminated boundary layer. This reduces the impedance to mass transport by increasing the concentration gradient at the wall on the dialysate side. This is accomplished by removing the contaminants from the wall region as quickly as possible so that they cannot diffuse back into the wall.

In a fiber cartridge, the improved dialysate circulation produced by this invention reduces the cost of the disposable cartriges by requiring fewer of the expensive hollw fibers than would otherwise be necessary.

BEST MODE FOR CARRYING OUT THE INVENTION

Figure 1:
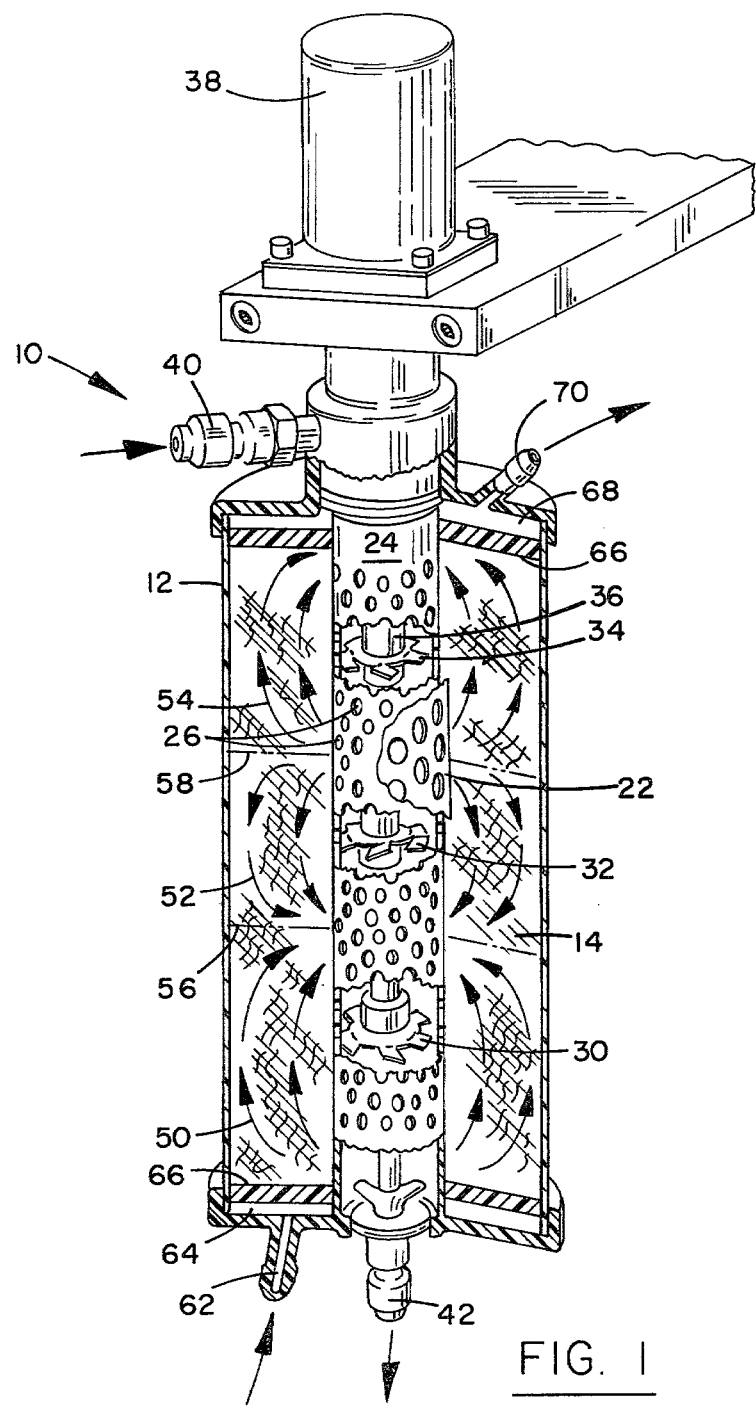
FIG. 1 is a perspective, partly cut-away view showing the device of this invention.
Figures 2, 3:
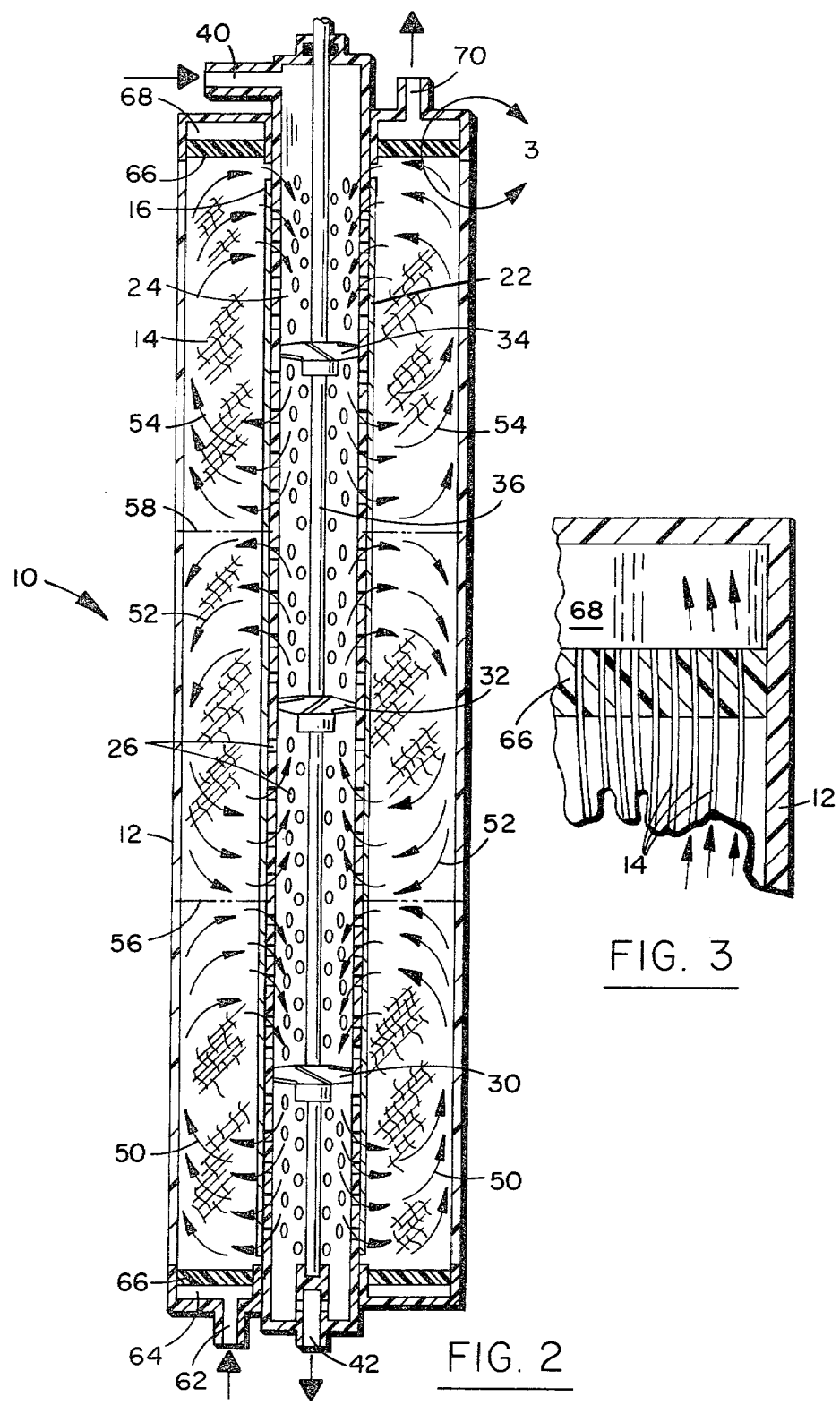
FIG. 2 is a section of the device of FIG. 1 along an axial plane.
FIG. 3 is a detail section of a portion of FIG. 2 along line 3—3.

The active element of the dialyzer of FIGS. 1 and 2 is a disposable dialysis cartridge 12 which contains spaced, longitudinally extending, semipermeable capillary membrane tubes or fibers 14 in exchange contact with a dialysate filling the cartridge 12. The exact disposition of the fibers 14 in the cartridge 12 is not material to this invention; in fact, the invention can also be used with charcoal bed cartridges or over membrane-type cartridges (including those using radially pleated membranes), provided their physical arrangement is such as to allow a toroidal fluid flow pattern. The example shown in the drawings uses fibers which are wound onto a hollow mandrel 16 in accordance with the teachings of my copending application Ser. No. 28,238, filed Apr. 9, 1979 and entitled "Mass Transfer Device and Method of Making the Same".

In accordance with this invention, the cylindrical cartridge 12 is provided with an axially extending hollow core whose walls are provided with as many openings 22 as the structural stability of the core reasonably allows. The core 16 slides over a cylindrical pump housing 24 which is also perforated with a large number of openings 26.

In the embodiment of FIGS. 1 through 3, a plurality of impeller elements 30, 32, 34 are mounted on a shaft driven by a pump motor 38. It will be noted that the blades of impeller 32 are oriented in a direction opposite to that of the blades of impellers 30, 34. Consequently, when the shaft 36 is rotated in a direction such that the impellers 30, 34 pump fluid downwardly, impeller 32 pumps fluid upwardly.

The pump motor 38, pump housing 24, shaft 36, and impeller elements 30, 32, 34 are reusable and can be easily separated from the disposable cartridge 12.

Fresh dialysate is introduced into the pump housing 24 through an inlet port 40, while the used dialysate is withdrawn through outlet port 42. The flow rate into and out of the ports 40, 42 is metered to be, for example, 0.5 l/min. The parameters of the pump motor 38 and impellers 30, 32, 34, however, are such that dialysate flows past the impellers 30, 32, 34 at a substantially greater rate (e.g., in a preferred embodiment, about 30 l/min). As far as the dialysate flow is concerned, the cartridge 12 is therefore essentially a closed vessel, and dialysate circulates in generally toroidal patterns about impellers 30, 32, 34 through openings 22, 26, as shown by the arrows in FIGS. 1 and 2.

It will be noted, as perhaps best shown in FIG. 2, that the direction of rotation of the dialysate flows in the toroidal patterns or fields 50, 52, 54 is such that a pair of virtual boundaries 56, 58 are created where the flows of adjacent toroids are tangential and in the same direction. The flow rate of dialysate across those boundaries is very low, generally on the order of the 0.5 l/min rate at which dialysate is supplied to the dialyzer. The device of this invention therefore tends to create a stack of as many distinct zones or cells of homogeneous impurity concentration in the dialysate as there are impellers; i.e., in the embodiment shown in the drawings, three cells corresponding to toroids 50, 52 and 54 respectively.

In the preferred counterflow mode of operation, blood is introduced into the hollow capillary fibers 14 from port 62 through plenum 64 which communicates with the interiors of fibers 14 at their lower ends, but which is sealed off from the interior of cartridge 12 by a potting compound 66 in which the ends of fibers 14 are anchored (see FIG. 3).

In the counterflow mode of FIG. 3, highly contaminated blood is first exposed to the used dialysate circulating in toroid 50 as it travels upward through the fibers 14. As the blood continues its upward travel, it eventually reaches the medium-concentration dialysate flowing in toroid 52 for stronger cleansing action. Finally, low-contamination blood reaches the toroid 54 containing fresh dialysate for removal of the last residues of contamination. The cleansed blood finally emerges into plenum 68 from which it can be withdrawn at port 70.

Figures 4, 5, 6:
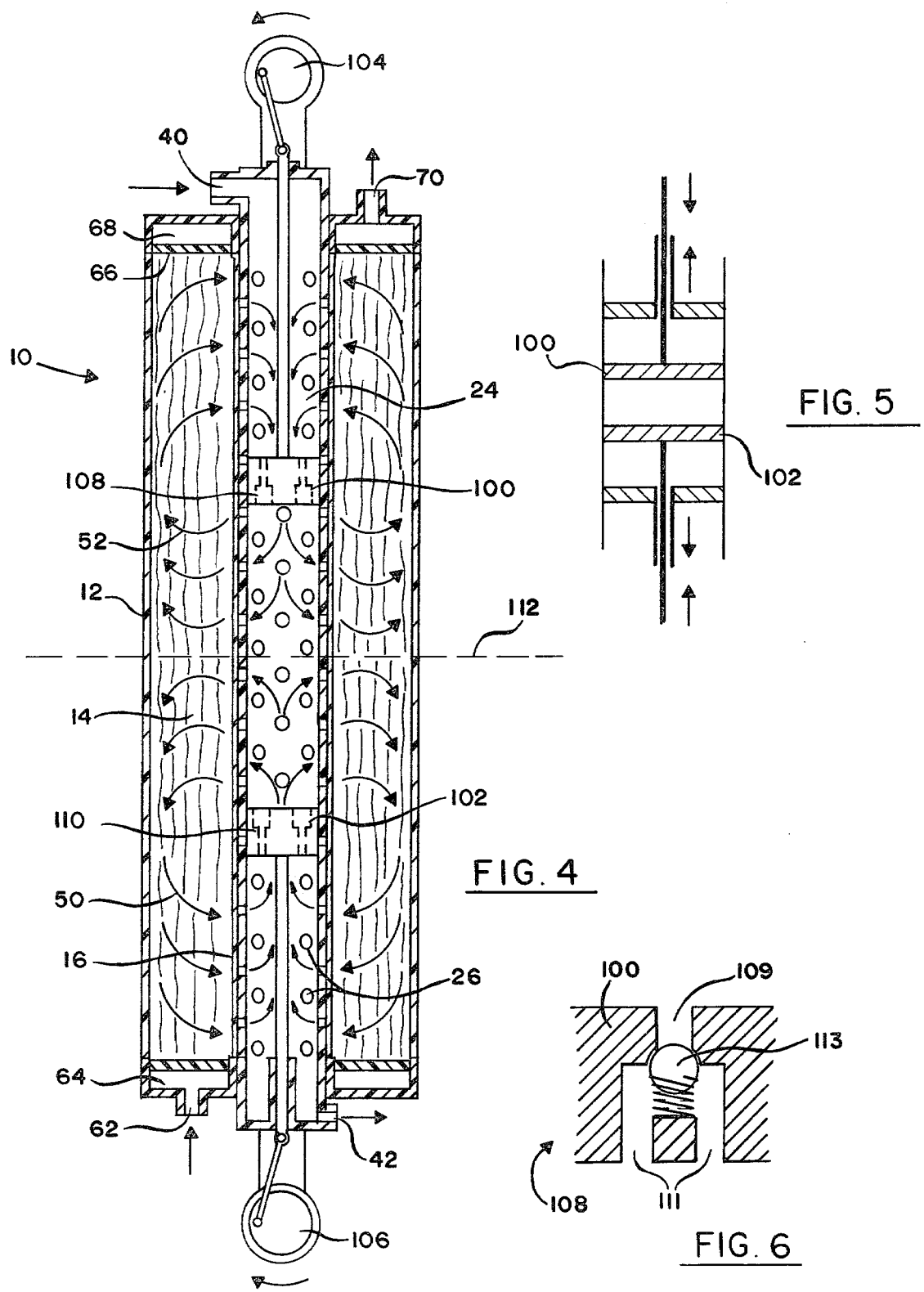
FIG. 4 is a section of an alternative embodiment of the device of FIG. 1 along an axial plane.
FIG. 5 is a schematic representation of another alternative embodiment of the device of FIG. 1.
FIG. 6 is a vertical section of a check valve which may be used in the device of FIG. 4.

FIG. 4 illustrates an alternative embodiment of the invention. Although the pumping action has been shown in the preferred embodiment as being produced by impeller elements 30, 32, 34 it is not necessary to use this particular mode of impulsion, and in fact it may not be desirable to do so because in some instances, better results can be obtained by creating an intermittent toroidal flow or a toroidal flow which reverses direction from time to time. These results can be accomplished by the embodiment of FIG. 4 in which the pumping action is created by pistons 100, 102 driven in synchronism with each other by appropriate motive devices 104, 106. The motion of pistons 100, 102 is so coordinated that they move at all times in directions opposite to one another; i.e. when piston 100 moves down, piston 102 moves up and vice versa.

The pistons 100, 102 may be provided with check valves 108, 110, respectively. The check valves 108, 110 (shown in more detail in FIG. 6) may be arranged, for example, so as to permit fluid flow through the pistons 100, 102 via passages 109, 111 when the pistons 100, 102 move away from the center line 112 of the device, and to obstruct fluid passage through the pistons, 100, 102 by means of the ball 113 when the pistons move toward the center line. This arrangement will produce an intermittent but unidirectional toroid movement of the dialysate in the direction shown by the arrows in FIG. 4. By contrast, omission of the check valves 108, 110, will result in a toroidal flow which changes direction back and forth as the pistons reciprocate.

Although FIG. 4 shows a cartridge with only two pistons, it will be understood that any conventional number of pistons may be used, as illustrated in FIG. 5. The practical limitation on the number of pistons used would be the complexity of the drive mechanism necessary to impart opposite directions of movement to adjacent pistons in order to create the homogeneous zones depicted in FIG. 3 and discussed hereinabove.

I claim:

1. The method of exposing generally longitudinally extending blood-carrying semi-permeable fibers, in a generally cylindrical blood dialysis cartridge having a coaxial hollow perforated core, to dialysate at a rapid flow rate, characterized in that a plurality of toroidal flow fields of said dialysate are produced within said cartridge, and that said fibers are immersed in said toroidal flow fields, said toroidal flow fields being axially adjacent in the direction of their axis, adjacent ones of said fields having opposite directions of rotation.

2. A method of producing a plurality of distinct generally homogeneous zones of different contaminant concentration in generally cylindrical mass transfer devices in which semipermeable tubes conveying a first fluid in a generally longitudinal direction through said device are disposed around a central hollow perforated core coaxial with said device and immersed in a second fluid flowing within said device, characterized in that a plurality of axially adjacent toroidal flow fields of said second fluid which intersect said tubes are produced within said device, said flow fields having opposite directions of rotation and being separated by virtual boundaries to form adjacent cells of homogeneous concentration of said second fluid; and that said second fluid is introduced into the first of said cells and withdrawn from the last of said cells.

3. The method of claim 2, further characterized in that the flow direction of said second fluid from introduction to withdrawal is opposite to the flow direction of said first fluid.

4. A mass transfer device comprising:
   (a) a generally cylindrical cartridge containing hollow semipermeable capillary tubes extending generally longitudinally of said cartridge;
   (b) means arranged to convey a first fluid through said tubes;
   (c) a hollow perforated core formed axially within said cartridge;
   (d) means to cause a second fluid to flow generally longitudinally through said cartridge, and
   (e) pump means arranged within said core to impel said second fluid into a plurality of toroidal flow patterns coaxial with said cartridge and spaced from one another in the direction of their axis, said pump means comprising a plurality of impeller elements spaced from one another along the axis of said cartridge, each of said impeller elements being arranged to produce a separate toroidal flow pattern for said second fluid.

5. The device of claim 4, in which said impeller elements are rotary impellers.

6. The device of claim 4, in which said impeller elements are reciprocating pistons.

7. The device of claim 6, in which said pistons include check valve means arranged to cause said pistons to impel fluid in one direction of reciprocation but not in the other.

8. A mass transfer device comprising:
   (a) a generally cylindrical cartridge containing hollow semipermeable capillary tubes extending generally longitudinally of said cartridge;
   (b) means arranged to convey a first fluid through said tubes;
   (c) a hollow perforated core formed axially within said cartridge;

(d) means to cause a second fluid to flow generally longitudinally through said cartridge, and (e) pump means arranged within said core to impel said second fluid into a plurality of toroidal flow patterns coaxial with said cartridge and spaced from one another in the direction of their axis, said pump means comprising a plurality of impeller elements spaced from one another along the axis of said cartridge, each of said impeller elements being arranged to produce a separate toroidal flow pattern for said second fluid and being so oriented as to create toroidal flows having opposite directions of rotation.

9. The mass transfer device of claim 8, further characterized in that the generally longitudinal flow directions of said first fluid through said tubes and of said second fluid through said core are opposite.

10. A blood dialysis device, comprising:

(a) an elongated cartridge;

(b) an elongated hollow perforated core disposed within said cartridge and generally coaxially therewith, said core having a dialysate inlet at one end and a dialysate outlet at the other;

(c) a plurality of hollow semipermeable fibers extending generally longitudinally through said cartridge outwardly of said core, said fibers being arranged to have blood conveyed therethrough and being immersed in said dialysate; and (d) a plurality of impeller means spaced from one another along the axis of said core, said impeller means being disposed within said core and arranged to toroidally impel said dialysate through said perforations and across said fibers in a plurality of separate toroidal patterns spaced along the axis of said core at a rate substantially greater than the flow rate of said dialysate between said inlet and said outlet.

11. A blood dialysis device, comprising:

(a) an elongated cartridge;

(b) an elongated hollow perforated core disposed within said cartridge and generally coaxially therewith, said core having a dialysate inlet at one end and a dialysate outlet at the other;

(c) a plurality of hollow semipermeable fibers extending generally longitudinally through said cartridge outwardly of said core, said fibers being arranged to have blood conveyed therethrough and being immersed in said dialysate; and (d) a plurality of impeller means spaced from one another along the axis of said core, said impeller means being disposed within said core and arranged to toroidally impel said dialysate through said perforations and across said fibers in a plurality of separate toroidal patterns spaced along the axis of said core at a rate substantially greater than the flow rate of said dialysate between said inlet and said outlet; and (e) adjacent ones of said impeller means being arranged to propel said dialysate in opposite directions.

* * * * *